United States Patent
Feng et al.

(10) Patent No.: US 11,317,409 B2
(45) Date of Patent: Apr. 26, 2022

(54) METHOD AND SYSTEM FOR ALLOCATING COMMUNICATION NETWORK RESOURCES

(71) Applicant: NATIONAL CHIAO TUNG UNIVERSITY, Hsinchu (TW)

(72) Inventors: Kai-Ten Feng, Taipei (TW); Chun-Hao Fang, Taoyuan (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 242 days.

(21) Appl. No.: 16/730,117

(22) Filed: Dec. 30, 2019

(65) Prior Publication Data

US 2021/0176741 A1   Jun. 10, 2021

(30) Foreign Application Priority Data

Dec. 4, 2019 (TW) ................................. 108144237

(51) Int. Cl.
*H04W 72/04* (2009.01)
*H04L 5/14* (2006.01)

(52) U.S. Cl.
CPC ............ *H04W 72/046* (2013.01); *H04L 5/14* (2013.01); *H04W 72/0446* (2013.01)

(58) Field of Classification Search
CPC .... H04W 72/046; H04W 72/0446; H04L 5/14
See application file for complete search history.

(56) References Cited

U.S. PATENT DOCUMENTS

| 10,244,409 | B2 | 3/2019 | Ridel et al. | |
| 2017/0033916 | A1* | 2/2017 | Stirling-Gallacher | .... H04L 5/14 |
| 2017/0303276 | A1* | 10/2017 | Cheng | .................. H04L 1/0015 |
| 2018/0049042 | A1 | 2/2018 | Yu et al. | |
| 2018/0368126 | A1* | 12/2018 | Islam | .................... H04L 5/1469 |
| 2019/0261315 | A1* | 8/2019 | Zhang | ............... H04W 56/0015 |

OTHER PUBLICATIONS

Ma et al., "Full-Duplex Relaying for D2D Communication in Millimeter Wave-based 5G Networks", IEEE Transactions On Wireless Communications, vol. 17, No. 7, Jul. 2018, pp. 4417-4431.
Zhang et al., "On Precoding and Energy Efficiency of Full-Duplex Millimeter-Wave Relays", IEEE Transactions On Wireless Communications, vol. 18, No. 3, Mar. 2019, pp. 1943-1956.

* cited by examiner

*Primary Examiner* — Jeffrey M Rutkowski
*Assistant Examiner* — Jasper Kwoh
(74) *Attorney, Agent, or Firm* — Birch, Stewart, Kolasch & Birch, LLP

(57) ABSTRACT

A method for allocating communication network resources assigns beam to multiple items of user equipment based on beam-closed manner, and allocates the beam to the item of user equipment with the smallest value if more than one item of the user equipment is assigned to the same beam Then, the method uses a rate control to the multiple items of user equipment according to rate closure manner, and determines whether all items of user equipment is assigned to the beam. Hence, the beam is emitted by the base station and the direction of the user ability align for efficient data transfer.

8 Claims, 2 Drawing Sheets

METHOD AND SYSTEM FOR ALLOCATING COMMUNICATION NETWORK RESOURCES

BACKGROUND

Technical Field

The present invention relates to allocate communication network resources, and in particular, the present invention relates to a method and system for allocating millimeter (mm)-wave full duplex communication network resources.

Related Art

By simultaneously transmitting and receiving signals at the same time slot with abundant spectrum, millimeter (mm)-wave based full-duplex (FD) systems has the potential to double spectrum efficiency (SE) of half-duplex (HD) transmission and to meet explosive growth of data-rate demand imposed on the future mobile networks. It has been shown that the bottleneck of mm-wave communications caused by severe pathloss problem can be alleviated by directional beamforming technique. However, the potential of mm-wave band cannot be fully exploited if beamforming resources are not properly utilized. Furthermore, major challenge of FD systems lies in the uplink (UL) communication due to coexistence of inter-user interference (IUI) and self-interference (SI). As a result, the interference energy of the uplink channel is too large, which in turn affects the performance of throughput.

SUMMARY

One object of the present invention is to provide a method and system for allocating network resources, which is capable of mm-wave full duplex communication. The invention uses an algorithm to design operation system of the present invention so as to achieve the optimal allocation of millimeter-wave full-duplex communication network resources by the dynamic channel environment of actual system operation, the user queue and the quality of experience (QoE) of user.

In one embodiment, the method for allocating communication network resources, which is capable of mm-wave full duplex network, and comprises: initializing network parameters and collecting queue status information and channel status information; assigning beam to multiple items of user equipment based on beam-closed manner; allocating the beam to the item of user equipment with the smallest value if more than one item of the user equipment is assigned to the same beam; using a rate control to the multiple items of user equipment according to rate closure manner; and determining whether all items of user equipment is assigned to the beam.

In one embodiment, the system for allocating communication network resources, which is capable of mm-wave full duplex network, and comprises: multiple items of user equipment; and a full duplex small cell base station, initializing network parameters and collecting queue status information and channel status information, assigning beam to the multiple items of user equipment based on beam-closed manner, allocating the beam to the item of user equipment with the smallest value if more than one item of the user equipment is assigned to the same beam, using a rate control to the multiple items of user equipment according to rate closure manner; and determining whether all items of user equipment is assigned to the beam.

DETAILED DESCRIPTION

Figure 1:
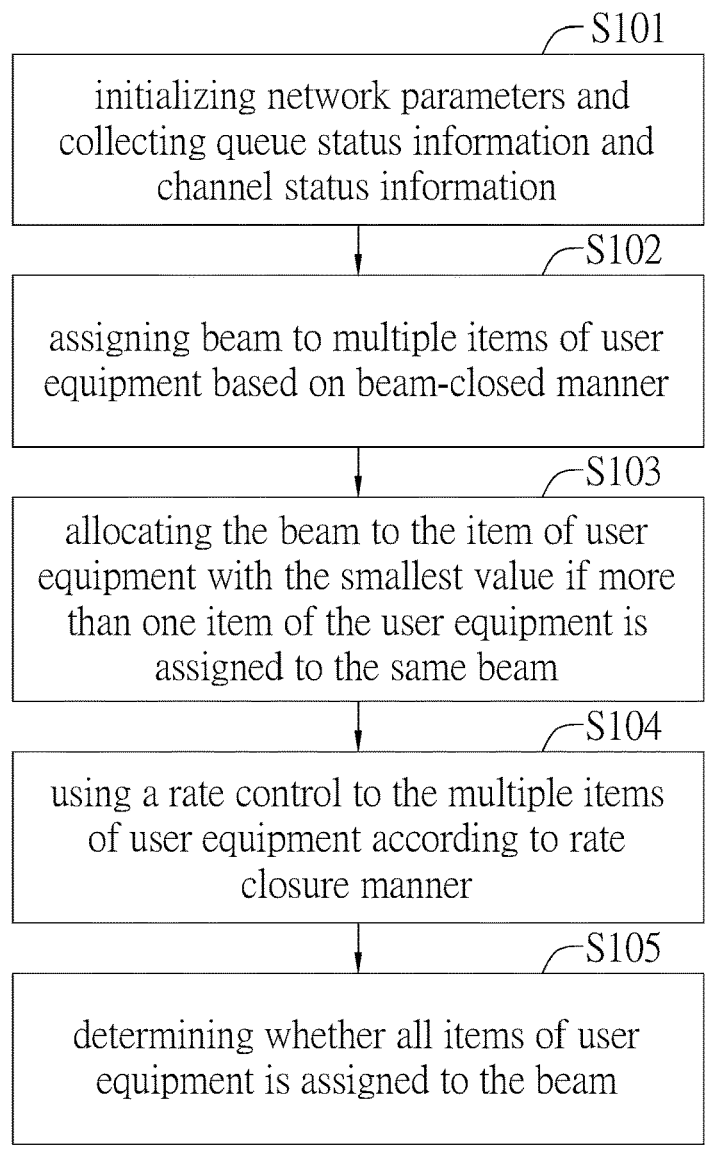
FIG. 1 shows a method for allocating communication network resources according to one embodiment of the present invention.

FIG. 1 shows a method for allocating communication network resources according to one embodiment of the present invention. The method for allocating communication network resources is capable of the millimeter wave (mm-wave) full duplex (FD) network. The method comprises: initializing network parameters and collecting queue status information and channel status information (the step of S101); assigning beam to multiple items of user equipment based on beam-closed manner (the step of S102); allocating the beam to the item of user equipment with the smallest value if more than one item of the user equipment is assigned to the same beam (the step of S103); using a rate control to the multiple items of user equipment according to rate closure manner (the step of S104); and determining whether all items of user equipment is assigned to the beam (the step of S105).

In the embodiment, the queue status information is generated after obtaining update signal via an uplink (UL) user equipment (UE) of a full duplex small cell base station, and the channel status information is generated via feedback of a full duplex small cell base station.

The beam-closed manner is given by $$Q_{U_m}(t+1) = \max[Q_{U_m}(t) - \Sigma_{n=1}^{N} R_{U_{m,n}}(t), 0] + A_{U_m}(t),$$

where the $Q_{U_m}(t)$ represents data backlog of m-th UL UE at time slot t, the $R_{U_{m,n}}(t)$ is a data transmission rate from m-th UL UE to n-th FD SBS at time slot t, the $A_{U_m}(t)$ in (1) is the amount of new data that enters into queue backlog (QB) of m-th UL UE at time slot t. Specifically, the m and n are positive integer, and t is the integer.

The rate closure manner is given by $$R_{U_{m,n}}(t) = \log_2\left(1 + \frac{d_{U_{m,n}}(t)}{I_{SI_{m,n}}(t) + I_{U_{m,n}}(t) + \sigma_{U_{m,n}}^2}\right),$$

where the $d_{U_{m,n}}(t)$ is a power of transmit signals from m-th UL UE to n-th FD SBS at time slot t.

In this paper, an mm-wave based FD SCN consisting of KD downlink (DL) UEs, KU UL UEs and N SWB FD SBSs is considered. Each SBS can form M beams and each beam can implement signal transmission and reception simultaneously. The FD SCN is operated in time slotted manner with duration normalized to integer units; thus, slot t refers to [t·t+1), t∈{0, 1, 2·...}. In each time slot, LT UEs transmit QB update to the associated FD SBS. Hence, FD SBSs will be able to collect queue state information (QSI) after obtaining updated signals from LTL UEs. Additionally, CSI can also be collected by FD SBSs from feedback channels. After collection of QSI and CSI are completed, all of SBSs will exchanged these information to the central scheduler (CS) via wired backhauls directly.

The BA and RC policies are determined at CS with joint information of QSI and CST. Let $Q_{U_m}(t)$ represents data backlog of m-th UL UE at time slot t, which will evolve according to the following dynamics as $$Q_{U_m}(t+1) = \max[Q_{U_m}(t) - \sum_{n=1}^{N} R_{U_{m,n}}(t), 0] + A_{U_m}(t) \quad (1)$$

Where $R_{U_{m,n}}(t)$ is the data transmission rate from m-th UL UE to n-th FD SBS at time slot t. $R_{U_{m,n}}(t)$ can also be written as $$R_{U_{m,n}}(t) = \log_2\left(1 + \frac{d_{U_{m,n}}(t)}{I_{SI_{m,n}} + I_{U_{m,n}}(t) + \sigma^2_{U_{m,n}}}\right) \quad (2)$$

Where $d_{U_{m,n}}(t)$ is the power of transmit signals from m-th UL UE to n-th FD SBS at time slot t and can be written as $$d_{U_{m,n}}(t) = \sum_{p=1}^{M} cU_{n,p,m}(t) pU_m(t) p U^{-\alpha}_{n,m}(t) D_p(\theta_{U_{n,m}}(t)) \quad (3)$$

The parameter $cU_{n,p,m}(t) \in \{0,1\}$ is binary indicators, where $cU_{n,p,m}(t) = 1$ means n-th FD SBS allocates is p-th beam to m-th UL UE at time slot t. $pU_m(t)$ is the transmission power of m-th UL UE at time slot t. $pU_{n,m}(t)$ is the distance between n-th FD SBS and a is the pathloss exponent. $D_p(\theta_{U_{n,m}}(t))$ denotes the directivity of p-th beam with regard to an angle of departure (AoD) between n-th FD SBS and m-th UL UE $\theta_{U_{n,m}}(t)$ at time slot t. In this letter, the beams on FD SBSs are formed by applying the Butler method. Hence, $D_p(\theta_{U_{n,m}}(t))$ can be rewritten as $D_p(\theta_{U_{n,m}}(t)) = M[kp(\theta_{U_{n,m}}(t))]^2$, with $M = 2^p$ (where $p \geq 1$ is an integer) and array factor $kp(\theta_{U_{n,m}}(t))$ given by $$kp(\theta_{U_{n,m}}(t)) = \frac{\sin(0.5M\pi\cos\theta_{U_{n,m}}(t) - \beta_p)}{M\sin\left(0.5M\pi\cos\theta_{U_{n,m}}(t) - \frac{1}{M}\beta_p\right)} \quad (4)$$

Where $$\beta_p = \left(-\frac{M+1}{2} + p\right)\pi,$$

$I_{SI_{m,n}}(t)$ in (2) is the SI power received by n-th FD SBS when processing signals from m-th UL UE at time slot t and can be summarized as $$I_{SI_{m,n}}(t) = \sum_{i=1}^{N}\sum_{j=1}^{M}\sum_{k=1}^{K_D} cD_{i,j,k}(t) pD_{i,j}(t) \varphi_{SI_{j,k,n}}(t)/\gamma \quad (5)$$

Where $pD_{i,j}(t)$ is the transmission power of i-th FD SBS allocated on the j-th beam at time slot t. $\varphi_{SI_{j,k,n}}(t) = \rho_{S_{i,n}}^{-\alpha}(t) D_j(\theta_{S_{i,n}}(t)) \cdot cD_{i,j,k}(t) \cdot \rho_{S_{i,n}}^{-\alpha}(t)$ and $D_j(\theta_{S_{i,n}}(t))$ are defined similarly to $cU_{n,p,m}(t)$, $\rho_{U_{n,m}}^{-\alpha}(t)$ and $D_p(\theta_{U_{n,m}}(t))$ with $\theta_{S_{i,n}}(t)$ denoting AoD between i-th and n-th FD SBS at time slot t. Note that the value of $cD_{i,j,k}(t)$ is randomly generated to cause different SI power at each time slot. $\gamma$ in (5) is the SI cancellation amount and can be written as $\gamma = \gamma_{PS} + \gamma_{AC} + \gamma_{DC}$, with $\gamma_{PS}$, $\gamma_{AC}$ and $\gamma_{DC}$ representing passive suppression (PS), analog cancellation (AC) and digital cancellation (DC) effects. $I_{U_{m,n}}(t)$ in (2) is the IUI power from other UL UEs received by n-th FD SBSs when processing signals from m-th UL UE at time slot t and can be expressed as $$I_{U_{m,n}}(t) = \sum_{p=1}^{M}\sum_{l=1,l\neq m}^{K_U} cU_{n,p,l}(t)\rho_{U_l}(t)\rho_{U_{n,l}}^{-\alpha}(t) D_p(\theta_{U_{m,i}}(t)) \quad (6)$$

$\sigma^2_{U_{m,n}}$ in (2) is variance of the additive white Gaussian noise (AWGN). Furthermore, $A_{U_m}(t)$ in (1) is the amount of new data that enters into QB of m-th UL UE at time slot t and can be described as $$A_{U_m}(t) = \sum_{n=1}^{N}\sum_{p=1}^{M} cU_{n,p,m}(t)\mu U_{m,n} \quad (7)$$

Where $\mu U_{m,n}(t)$ is admission rate of data to enter into QB of m-th UL UE to n-th FD SBS. Moreover, the metric to measure QoE for m-th UL UE is defined as $$sU_m(t) = \begin{cases} \dfrac{U_m(\mu U_m(t))}{U_m^{max}}, & \text{if } 0 \leq U_m(\mu U_m(t)) \leq U_n^{max}, \\ 1, & \text{otherwise} \end{cases} \quad (8)$$

where $U_m(\mu U_m(t)) = \log_2(A_{U_m}(t))$. $U_m^{max}$ represents quality of experience requirement (QoER) of m-th UL UE. This satisfaction model is suitable for application with QoER where CS will not allocate wireless resources for further improvement when UE has already been served with its QoER. In contrast, the satisfaction of quality will suffer severe degradation when service rate is lower than the required one.

Note that in SWB systems, each UL UE can select at most one beam to transmit, and each beam can be used by at most one UL UE at each time slot. Besides, with assumption of finite QB in the considered FD SCN, stability of the network should be guaranteed. The corresponding constraints can be written as $$\sum_{n=1}^{N}\sum_{p=1}^{M} cU_{n,p,m}(t) \leq 1, \forall n,p,m,t, \quad (9)$$

$$\sum_{m=1}^{K_U} cU_{n,p,m}(t) \leq 1, \forall n,p,m,t \quad (10)$$

$Q_{U_m}(t)$ is mean rate stable, $\forall m,t$ \quad (11)

Additionally, the constraint for BA indicator is given as $$c_{U_{n,p,m}}(t), \forall n,p,m,t \quad (12)$$

The objective function of the considered problem is to maximized the time-average QoE and the associated stochastic optimization problem can be formulated as $$\max_{c_U,\mu_U} \lim_{T \to \infty} \frac{1}{T}\sum_{t=0}^{T-1} E\left\{\sum_{m=1}^{K_U} sU_m(t)\right\} \quad (13)$$

Where $c_U$ and $\mu_U$ are symbolic notations of design variables representing BA and RC respectively. (9)-(10) and (12) are constraints for BA. (11) is network stability constraint since a network is stable if all individual queues in the network are mean rate stable. It should be noted that the existence of long-term objective function (13) and constraint (11) require the collection of CSI over periods of time slot.

One of the major contributions of this work is to apply Lyapunov optimization technique to obtain closed-form solutions for problem (13). Employing Lyapunov method, problem (13) can be rewritten as $$\min_{c_U,\mu_U} \prod(t) - V\left(\sum_{m=1}^{K_U} sU_m(t)\right), \text{ with} \quad (14)$$

$$\prod(t) = \sum_{m=1}^{K_U} Q_{U_m}(t)\left(A_{U_m}(t) - \sum_{n=1}^{N} R_{U_{m,n}}(t)\right) \quad (15)$$

Right hand side of (15) can be regarded as the amount of arrived data $A_{U_m}(t)$ minus the quantity of departed data $R_{U_m}(t)$ from QB weighted by queue length $Q_{U_m}(t)$ for m-th UL UE at time slot t. V in (14) is a non-negative parameter and can be adjusted to achieve trade-off between system delay and UEs' QoE. It should be noticed that problem (14) only depends on CSI and QSI in each time slot and therefore, collection of CSI across different time slots is not needed. In addition, weight $Q_{U_m}(t)$ in $\Pi(t)$ makes solution of problem (14) able to focus resources on UE who has more data to transmit in the QB. To develop closed-form solutions, the following lemma is introduced.

Lemma 1: The considered SWB FD SCN possesses following properties:

(a) Total transmission rate of m-th UL UE can be equivalently described as $$\sum_{n=1}^{N} R_{U_{m,n}}(t) = \sum_{n=1}^{N} \sum_{p=1}^{M_c} U_{n,p,m}(t) R_{U_{m,n,p}}(t) \quad (16),\text{with}$$

$$R_{U_{m,n,p}}(t) = \log_2\left(1 + \frac{pU_m(t)\rho_{U_{n,m}}^{-a}(t) D_p(\theta_{U_{n,m}(t)})}{I_{SI_{m,n}}(t) + I_{U_{m,n}}(t) + \sigma^2_{U_{m,n}}}\right) \quad (17)$$

Which is interpreted as achievable transmission rate when m-th UL UE utilizes p-th beam on n-th FD SBS.

(b) The QoER $U_m(\mu U_m(t))$ in (8) can be equally rewritten as $$U_m(\mu U_m(t)) = \sum_{n=1}^{N} \sum_{p=1}^{M_c} U_{n,p,m}(t) \log_2(\mu U_{m,n}(t)) \quad (18)$$

Figure 2:
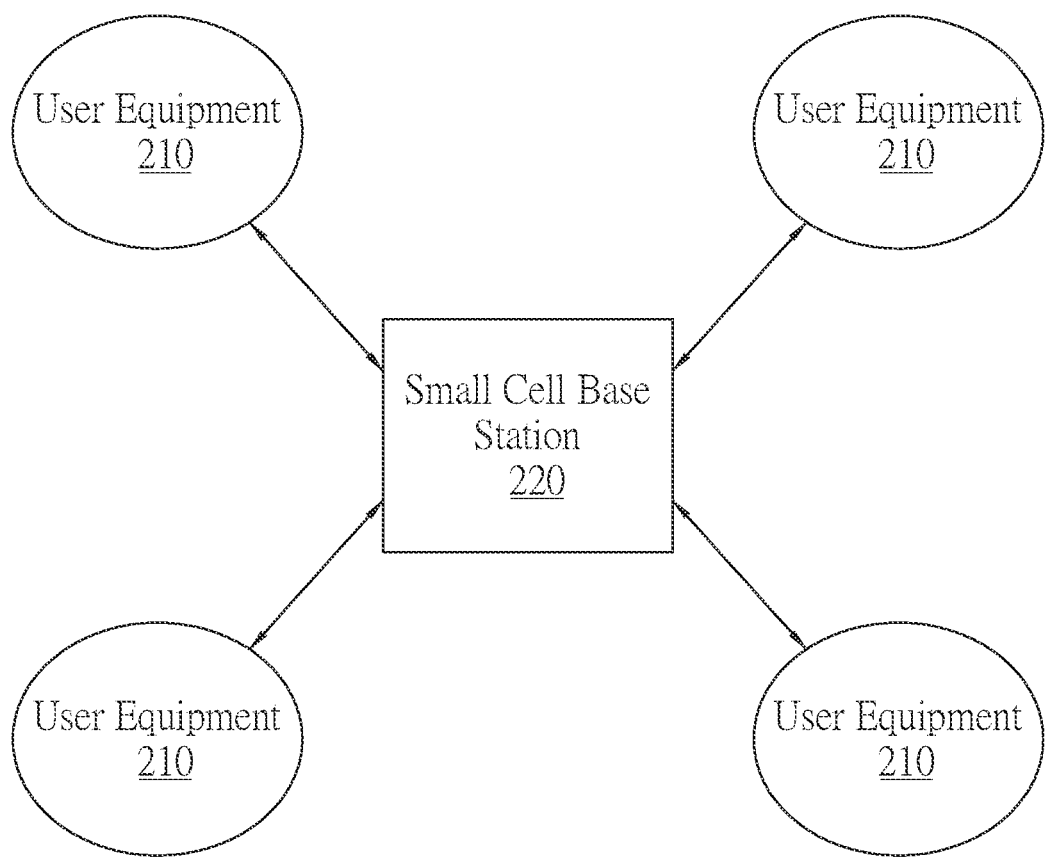
FIG. 2 shows a system for allocating communication network resources according to one embodiment.

FIG. 2 shows a system for allocating communication network resources according to one embodiment of the present invention. The system for allocating communication network resources is capable of the millimeter wave (mm-wave) full duplex (FD) network. The system comprises: multiple items of user equipment 210; a full duplex small cell base station 220, which is used for initializing network parameters and collecting queue status information and channel status information, assigning beam to the multiple items of user equipment based on beam-closed manner, allocating the beam to the item of user equipment with the smallest value if more than one the user equipment is assigned to the same beam, using a rate control to the multiple items of user equipment according to rate closure manner; and determining whether all items of user equipment is assigned to the beam.

In the embodiment, the queue status information is generated after obtaining update signal via an uplink (UL) user equipment (UE) of a full duplex small cell base station, and the channel status information is generated via feedback of a full duplex small cell base station.

The beam-closed manner is given by $$Q_{U_m}(t+1) = \max[Q_{U_m}(t) - \sum_{n=1}^{N} R_{U_{m,n}}(t), 0] + A_{U_m}(t),$$

where the $Q_{U_m}(t)$ represents data backlog of m-th UL UE at time slot t, the $R_{U_{m,n}}(t)$ is a data transmission rate from m-th UL UE to n-th FD SBS at time slot t, the $A_{U_m}(t)$ in (1) is the amount of new data that enters into QB of m-th UL UE at time slot t. Specifically, the m and n are positive integer, and t is the integer.

The rate closure manner is given by $$R_{U_{m,n}}(t) = \log_2\left(1 + \frac{d_{U_{m,n}}(t)}{I_{SI_{m,n}}(t) + I_{U_{m,n}}(t) + \sigma^2_{U_{m,n}}}\right),$$

where the $d_{U_{m,n}}(t)$ is a power of transmit signals from m-th UL UE to n-th FD SBS at time slot t.

The invention addresses resource allocation problem for Ul of mm-wave based switched-beam (SWB) full-duplex (FD) small cell networks (SCN) with consideration of UEs' queue backlog (QB) and dynamic channel condition. The formulated problem becomes more tractable and only depends on CSI and QSI in each time slot after applying Lyapunov optimization method. Moreover, novel closed form solution for BA and RC decision are derived by exploiting beam constraints in SWB system. Then, an IBARC algorithm is proposed based on the closed-form solution. Numerical results show that the proposed IBARC algorithm outperforms conventional dynamic data rate optimal (DDRO) method in terms of system delay and UEs' quality of experience (QoE).

The invention focuses on designing a resource allocation algorithm suitable for a full-duplex millimeter network. A full-duplex system has the potential to achieve twice the frequency efficiency of a half-duplex system due to its uplink and downlink transmission characteristics at the same time and the same frequency band. With regard to conventional patents and research on full duplex, most of them focus on designing resource allocation algorithms to mitigate the effects of self-interference caused by simultaneous transmission and reception. Millimeter-wave communication has received a lot of attention and research due to its characteristics of large bandwidth and directivity. Some studies on millimeter-wave communication focus on how to effectively use its beam resources, so that the beam emitted by the base station and the direction of the user ability align for efficient data transfer.

Both full-duplex systems and millimeter-wave communication are forward-looking technologies. In a full-duplex millimeter-wave system combining the both, an obvious problem is how to make the base station's beam sufficiently aligned with the user's position, so that the self-interference energy of the entire system is not too large. However, looking at the available information, whether it is patents in the industry or academic literature, no preliminary discussion has been found on how to perform effective beam management and allocation in the presence of self-interference in a full-duplex millimeter wave system. The preliminary discussion of the general beam management literature is only for the ideal static environment, and ignores the queue backlog in the system. The invention can be practically applied to existing full-duplex communication equipment (such as a base station, a mobile device or a communication switching device, etc.) for optimizing and distributing signal transmission.

The present invention is designed to take into account the dynamic channel environment of the actual system operation, the user queue, and the quality of experience (QoE) of the user, compared with the general preliminary discussion for in-depth. Therefore, the system parameters (including user queue, dynamic environment, QoE, and full-duplex self-interference) considered from the system architecture (full-duplex millimeter-wave system) and resource allocation issues are quite different from the existing patents and literature.

The present invention is described in the foregoing related embodiments, but the foregoing embodiments are merely examples for implementing the present invention. It needs be noted that the disclosed embodiments do not limit scope of the present invention. On the contrary, all modifications and equivalents included in a spirit and the scope of the present invention are included in the scope of the present invention.

What is claimed is:

1. A method for allocating communication network resources, comprising:
   initializing network parameters and collecting queue status information and channel status information;
   assigning beam to multiple items of user equipment based on beam-closed manner;
   allocating the beam to the item of user equipment with the smallest value if more than one item of the user equipment is assigned to the same beam;
   using a rate control to the multiple items of user equipment according to rate closure manner; and
   determining whether all items of user equipment is assigned to the beam;
   wherein the rate closure manner is given by $$R_{U_{m,n}}(t) = \log_2\left(1 + \frac{d_{U_{m,n}}(t)}{I_{SI_{m,n}}(t) + I_{U_{m,n}}(t) + \sigma^2_{U_{m,n}}}\right),$$

where the $d_{U_{m,n}}(t)$ is a power of transmit signals from m-th uplink (UL) user equipment UE to n-th full duplex (FD) small cell base station (SBS) at time slot t.

2. The method according to claim 1, wherein the queue status information is generated after obtaining update signal via the uplink (UL) user equipment (UE) of the full duplex (FD) small cell base station (SBS).

3. The method according to claim 1, wherein the channel status information is generated via feedback of the full duplex (FD) small cell base station (SBS).

4. The method according to claim 1, wherein the beam-closed manner is given by $$Q_{U_m}(t+1) = \max[Q_{U_m}(t) - \Sigma_{n=1}^{N} R_{U_{m,n}}(t), 0] + A_{U_m}(t),$$

where the $Q_{U_m}(t)$ represents data backlog of m-th UL UE at time slot t, the $R_{U_{m,n}}(t)$ is a data transmission rate from m-th UL UE to n-th FD SBS at time slot t, the $A_{U_m}(t)$ is the amount of new data that enters into queue backlog (QB) of m-th UL UE at time slot t.

5. A system for allocating communication network resources, comprising:
   multiple items of user equipment; and
   a full duplex small cell base station, initializing network parameters and collecting queue status information and channel status information, assigning beam to the multiple items of user equipment based on beam-closed manner, allocating the beam to the item of user equipment with the smallest value if more than one the user equipment is assigned to the same beam, using a rate control to the multiple items of user equipment according to rate closure manner; and determining whether all items of user equipment is assigned to the beam;
   wherein the rate closure manner is given by $$R_{U_{m,n}}(t) = \log_2\left(1 + \frac{d_{U_{m,n}}(t)}{I_{SI_{m,n}}(t) + I_{U_{m,n}}(t) + \sigma^2_{U_{m,n}}}\right),$$

where the $d_{U_{m,n}}(t)$ is a power of transmit signals from m-th uplink (UL) user equipment (UE) to n-th full duplex (FD) small cell base station (SBS) at time slot t.

6. The system according to claim 5, wherein the queue status information is generated after obtaining update signal via the uplink (UL) user equipment (UE) of the full duplex (FD) small cell base station (SBS).

7. The system according to claim 5, wherein the channel status information is generated via feedback of the full duplex small cell base station.

8. The system according to claim 5, wherein the beam-closed manner is given by $$Q_{U_m}(t+1) = \max[Q_{U_m}(t) - \Sigma_{n=1}^{N} R_{U_{m,n}}(t), 0] + A_{U_m}(t),$$

where the $Q_{U_m}(t)$ represents data backlog of m-th UL UE at time slot t, the $R_{U_{m,n}}(t)$ is a data transmission rate from m-th UL UE to n-th FD SBS at time slot t, the $A_{U_m}(t)$ is the amount of new data that enters into QB of m-th UL UE at time slot t.

* * * * *